United States Patent
Sakamoto et al.

(10) Patent No.: US 10,875,977 B2
(45) Date of Patent: Dec. 29, 2020

(54) ACTIVE ENERGY RAY-CURABLE RESIN COMPOSITION, ANTIFOGGING ANTIFOULING LAMINATE, ARTICLE, METHOD FOR PRODUCING SAME, AND ANTIFOULING METHOD

(71) Applicant: Dexerials Corporation, Shinagawa-ku, Tokyo (JP)

(72) Inventors: Shogo Sakamoto, Tokyo (JP); Ryosuke Endo, Tokyo (JP); Mikihisa Mizuno, Tokyo (JP); Shinobu Hara, Tokyo (JP)

(73) Assignee: Dexerials Corporation, Tokyo (JP)

( * ) Notice: Subject to any disclaimer, the term of this patent is extended or adjusted under 35 U.S.C. 154(b) by 168 days.

(21) Appl. No.: 15/569,276

(22) PCT Filed: Apr. 15, 2016

(86) PCT No.: PCT/JP2016/062118
§ 371 (c)(1),
(2) Date: Oct. 25, 2017

(87) PCT Pub. No.: WO2016/175054
PCT Pub. Date: Nov. 3, 2016

(65) Prior Publication Data
US 2018/0118907 A1  May 3, 2018

(30) Foreign Application Priority Data

Apr. 28, 2015 (JP) ................. 2015-091287
Aug. 10, 2015 (JP) ................. 2015-158291
Apr. 5, 2016 (JP) ................. 2016-075819

(51) Int. Cl.
*C08J 7/04* (2020.01)
*C08F 20/20* (2006.01)
(Continued)

(52) U.S. Cl.
CPC ............. *C08J 7/0427* (2020.01); *B29C 45/14* (2013.01); *B29C 45/72* (2013.01); *B32B 7/02* (2013.01); *B32B 7/12* (2013.01); *B32B 9/002* (2013.01); *B32B 9/045* (2013.01); *B32B 15/082* (2013.01); *B32B 15/085* (2013.01); *B32B 15/088* (2013.01); *B32B 15/09* (2013.01); *B32B 15/095* (2013.01); *B32B 15/18* (2013.01); *B32B 15/20* (2013.01); *B32B 23/08* (2013.01); *B32B 23/20* (2013.01); *B32B 27/00* (2013.01); *B32B 27/08* (2013.01); *B32B 27/16* (2013.01); *B32B 27/281* (2013.01); *B32B 27/285* (2013.01); *B32B 27/286* (2013.01); *B32B 27/30* (2013.01); *B32B 27/302* (2013.01); *B32B 27/304* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *B32B 38/1866* (2013.01); *C08F 2/48* (2013.01); *C08F 20/20* (2013.01); *C08F 220/28* (2013.01); *C08F 222/1006* (2013.01); *C08F 290/062* (2013.01); *C09D 4/00* (2013.01); *C09D 5/1668* (2013.01); *C09D 135/02* (2013.01); *B29C 2045/14155* (2013.01); *B32B 2250/02* (2013.01); *B32B 2250/03* (2013.01); *B32B 2250/24* (2013.01); *B32B 2250/40* (2013.01); *B32B 2255/06* (2013.01); *B32B 2255/10* (2013.01); *B32B 2255/26* (2013.01); *B32B 2255/28* (2013.01);
(Continued)

(58) Field of Classification Search
None
See application file for complete search history.

(56) References Cited

U.S. PATENT DOCUMENTS

| 7,480,928 | B2 * | 1/2009 | Yamasaki | G11B 7/24056 |
| | | | | 428/64.1 |
| 9,290,666 | B2 | 3/2016 | Takihara et al. | |

(Continued)

FOREIGN PATENT DOCUMENTS

| JP | H08-208773 | 8/1996 |
| JP | 2001-233638 | 8/2001 |

(Continued)

OTHER PUBLICATIONS

European Patent Office, Extended Search Report for corresponding European Application No. 16786331.5, dated Apr. 16, 2019.

(Continued)

*Primary Examiner* — Sheeba Ahmed
(74) *Attorney, Agent, or Firm* — Carmody Torrance Sandak & Hennessey LLP

(57) ABSTRACT

An anti-fogging and anti-fouling laminate, including: a substrate; and an anti-fogging and anti-fouling layer on the substrate where a surface of the anti-fogging and anti-fouling layer is flat, wherein the anti-fogging and anti-fouling layer is a cured product obtained by curing an active energy ray curable resin composition through an active energy ray, wherein the active energy ray curable resin composition includes a hydrophilic monomer having a radically polymerizable unsaturated group and a photopolymerization initiator, wherein a content of the hydrophilic monomer having a radically polymerizable unsaturated group in the active energy ray curable resin composition is 60% by mass or more, and wherein a surface of the anti-fogging and anti-fouling layer has a pure water contact angle of 90° or more.

10 Claims, 5 Drawing Sheets

(51) Int. Cl.
| | |
|---|---|
| *C08F 2/48* | (2006.01) |
| *C09D 4/00* | (2006.01) |
| *C09D 135/02* | (2006.01) |
| *B32B 27/00* | (2006.01) |
| *B32B 27/16* | (2006.01) |
| *B32B 27/40* | (2006.01) |
| *B32B 7/02* | (2019.01) |
| *B32B 15/18* | (2006.01) |
| *B32B 15/20* | (2006.01) |
| *B32B 27/42* | (2006.01) |
| *B32B 27/30* | (2006.01) |
| *B32B 7/12* | (2006.01) |
| *B32B 27/36* | (2006.01) |
| *B32B 27/08* | (2006.01) |
| *B32B 27/38* | (2006.01) |
| *B32B 23/20* | (2006.01) |
| *B32B 23/08* | (2006.01) |
| *B32B 27/28* | (2006.01) |
| *B32B 27/32* | (2006.01) |
| *B32B 9/04* | (2006.01) |
| *B32B 15/09* | (2006.01) |
| *B32B 15/082* | (2006.01) |
| *B32B 9/00* | (2006.01) |
| *C09D 5/16* | (2006.01) |
| *B32B 27/34* | (2006.01) |
| *B32B 38/18* | (2006.01) |
| *B32B 15/095* | (2006.01) |
| *B32B 15/088* | (2006.01) |
| *B32B 15/085* | (2006.01) |
| *C08F 220/28* | (2006.01) |
| *C08F 290/06* | (2006.01) |
| *B29C 45/14* | (2006.01) |
| *B29C 45/72* | (2006.01) |
| *C08F 222/10* | (2006.01) |
| *C08F 20/24* | (2006.01) |
| *C09D 151/08* | (2006.01) |

(52) U.S. Cl.
CPC ..... *B32B 2307/40* (2013.01); *B32B 2307/412* (2013.01); *B32B 2307/418* (2013.01); *B32B 2307/50* (2013.01); *B32B 2307/73* (2013.01); *B32B 2307/756* (2013.01); *B32B 2457/12* (2013.01); *B32B 2551/08* (2013.01); *B32B 2605/006* (2013.01); *C08F 20/24* (2013.01); *C08F 220/286* (2020.02); *C08F 222/103* (2020.02); *C08F 222/104* (2020.02); *C08J 2369/00* (2013.01); *C08J 2435/02* (2013.01); *C09D 151/08* (2013.01)

(56) References Cited

U.S. PATENT DOCUMENTS

| | | | |
|---|---|---|---|
| 2007/0048531 A1* | 3/2007 | Nagaoka | C08J 7/04 428/447 |
| 2009/0148648 A1* | 6/2009 | Aoki | C08F 290/06 428/64.4 |
| 2012/0077046 A1 | 3/2012 | Asahi et al. | |
| 2014/0205801 A1 | 7/2014 | Iwata et al. | |

FOREIGN PATENT DOCUMENTS

| | | |
|---|---|---|
| JP | 2005-111756 | 4/2005 |
| JP | 2007-046049 | 2/2007 |
| JP | 2009-114248 | 5/2009 |
| JP | 2009-215517 | 9/2009 |
| JP | 2012-088699 A | 5/2012 |
| JP | 2012-224709 | 11/2012 |
| JP | 2012-250353 | 12/2012 |
| JP | 2014-159154 | 9/2014 |
| JP | 2016-006160 | 1/2016 |
| TW | 201137058 | 11/2011 |
| TW | 201144073 | 12/2011 |
| WO | 2005032814 | 4/2005 |
| WO | 2009133784 | 11/2009 |

OTHER PUBLICATIONS

Notice of Reasons for Refusal, dated Feb. 6, 2018, issued for corresponding Japanese Patent Application No. 2016-245480.

Taiwanese Patent Office, Office Action issued in corresponding Taiwanese Application No. 105111324, dated Jul. 30, 2019.

Taiwanese Patent Office, Decision of Refusal issued in corresponding Taiwanese Application No. 105111324, dated Feb. 3, 2020 (p. 3 of the Decision of Refusal cites TW 2011/37058 and TW 2011/44073, both of which were previously cited).

Japanese Patent Office, Japanese Office Action issued in corresponding Japanese Application No. 2016-075819 dated Jun. 14, 2016.

* cited by examiner

ACTIVE ENERGY RAY-CURABLE RESIN COMPOSITION, ANTIFOGGING ANTIFOULING LAMINATE, ARTICLE, METHOD FOR PRODUCING SAME, AND ANTIFOULING METHOD

TECHNICAL FIELD

The present invention relates to an anti-fogging and anti-fouling laminate, a product using the anti-fogging and anti-fouling laminate, a method for manufacturing the product, an anti-fouling method using the anti-fogging and anti-fouling laminate, and an active energy ray curable resin composition that can be used for manufacturing the anti-fogging and anti-fouling laminate. The anti-fogging and anti-fouling laminate has anti-fogging and anti-fouling properties, and can be used in a wide variety of fields (building use, industrial use, automobile use, optical use, solar battery panels, etc.). In addition, the anti-fogging and anti-fouling laminate can be manufactured through a simple molding process.

BACKGROUND ART

To decorate and protect the surfaces of products, resin films and glass and the like are attached to the surfaces.

However, the resin films and glass decorating and protecting the surfaces of products sometimes get cloudy and dirty to reduce visibility and good appearance of the products.

To prevent reduction of visibility and good appearance of products, an anti-fogging treatment is applied to the resin films and glass.

For example, there has been proposed a coating film-forming substrate having anti-fogging property, in which a silane-based coupling layer serving as an underlying layer, an organic/inorganic composite coating film serving as a water absorption layer, and a hydrophobic processing layer serving as a protective layer are laminated on a surface of a substrate in this order (see, for example, PTL 1).

However, this proposed technique shows low producibility because the three layers (i.e., the underlying layer, the water absorption layer and the protective layer) are laminated on the surface of the substrate, which is problematic.

CITATION LIST

Patent Literature

PTL 1 Japanese Patent Application Laid-Open No. 2001-233638

SUMMARY OF INVENTION

Technical Problem

An object of the present invention is to solve the aforementioned problems in the art and attain the following object. More specifically, an object of the present invention is to provide an anti-fogging and anti-fouling laminate, which is excellent in anti-fogging property, anti-fouling property and producibility, a product using the anti-fogging and anti-fouling laminate, a method for manufacturing the product, an anti-fouling method using the anti-fogging and anti-fouling laminate, and an active energy ray curable resin composition that can be used for manufacturing the anti-fogging and anti-fouling laminate.

Solution to Problem

Means for solving the problems are as follows. That is,
<1> An anti-fogging and anti-fouling laminate, including:
a substrate; and
an anti-fogging and anti-fouling layer on the substrate where a surface of the anti-fogging and anti-fouling layer is flat,
wherein the anti-fogging and anti-fouling layer is a cured product obtained by curing an active energy ray curable resin composition through an active energy ray,
wherein the active energy ray curable resin composition includes a hydrophilic monomer having a radically polymerizable unsaturated group and a photopolymerization initiator,
wherein a content of the hydrophilic monomer having a radically polymerizable unsaturated group in the active energy ray curable resin composition is 60% by mass or more, and
wherein a surface of the anti-fogging and anti-fouling layer has a pure water contact angle of 90° or more.
<2> The anti-fogging and anti-fouling laminate according to <1>, wherein the active energy ray curable resin composition further includes a hydrophobic monomer having a radically polymerizable unsaturated group.
<3> The anti-fogging and anti-fouling laminate according to <2>, wherein a content of the hydrophobic monomer having a radically polymerizable unsaturated group in the active energy ray curable resin composition is more than 0.018% by mass.
<4> The anti-fogging and anti-fouling laminate according to any one of <1> to <3>, wherein the substrate is a substrate made of a resin or an inorganic substrate.
<5> A product, including:
the anti-fogging and anti-fouling laminate according to any one of <1> to <4> on a surface thereof.
<6> A method for manufacturing the product according to <5>, the method including:
heating the anti-fogging and anti-fouling laminate; and
molding the anti-fogging and anti-fouling laminate heated into a desired shape.
<7> The method for manufacturing the product according to <5>,
wherein the heating is performed by infrared heating.
<8> An anti-fouling method for protecting a product from getting dirty, the method including:
laminating an anti-fogging and anti-fouling laminate on a surface of the product, the anti-fogging and anti-fouling laminate being the anti-fogging and anti-fouling laminate according to any one of <1> to <4>.
<9> An active energy ray curable resin composition, including:
a hydrophilic monomer having a radically polymerizable unsaturated group;
a hydrophobic monomer having a radically polymerizable unsaturated group; and
a photopolymerization initiator,
wherein when the active energy ray curable resin composition is cured through an active energy ray to form an anti-fogging and anti-fouling layer, a surface of the anti-fogging and anti-fouling layer has a pure water contact angle of 90° or more.
<10> The active energy ray curable resin composition according to <9>, wherein the hydrophilic monomer having a radically polymerizable unsaturated group is a (meth) acrylate including a polyoxyalkylene chain, and the hydrophobic monomer having a radically polymerizable unsaturated group is a (meth)acrylate including at least one of fluorine and silicon.

ADVANTAGEOUS EFFECTS OF THE INVENTION

According to the present invention, the problems in the art are overcome and the objects of the present invention can be attained. In addition, it is possible to provide an anti-fogging and anti-fouling laminate, which is excellent in anti-fogging property, anti-fouling property and producibility, a product using the anti-fogging and anti-fouling laminate, a method for manufacturing the product, an anti-fouling method using the anti-fogging and anti-fouling laminate, and an active energy ray curable resin composition that can be used for manufacturing the anti-fogging and anti-fouling laminate.

DESCRIPTION OF EMBODIMENTS

Anti-Fogging and Anti-Fouling Laminate

Figure 1A:
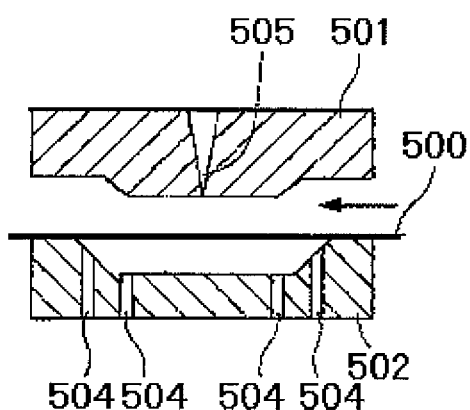
FIG. 1A is a process drawing for describing an example of manufacturing a product of the present invention by in-mold molding.

The anti-fogging and anti-fouling laminate of the present invention includes at least: a substrate, and an anti-fogging and anti-fouling layer; and further includes other members as necessary.
<Substrate>

Examples of the substrate, which is not particularly limited and can be appropriately selected depending upon the purpose, include a substrate made of a resin and an inorganic substrate.

The material for the substrate made of a resin is not particularly limited and can be appropriately selected depending upon the purpose. Examples of the material include triacetylcellulose (TAC), polyester (TPEE), polyethylene terephthalate (PET), polyethylenenaphthalate (PEN), polyimide (PI), polyamide (PA), aramid, polyethylene (PE), polyacrylate, polyethersulfone, polysulfone, polypropylene (PP), polystyrene, diacetylcellulose, polyvinyl chloride), an acrylic resin (PMMA), polycarbonate (PC), an epoxy resin, a urea resin, a urethane resin, a melamine resin, a phenolic resin, an acrylonitrile-butadiene-styrene copolymer, a cycloolefin polymer (COP), a cycloolefin copolymer (COC), a PC/PMMA laminate and a rubber-added PMMA.

Examples of the inorganic substrate include metallic oxides (quartz, sapphire, glass, etc.), metals (iron, chromium, nickel, molybdenum, niobium, copper, titanium, aluminum, zinc, silicon, magnesium, manganese, etc.), and alloys (combinations of the metals etc.).

The substrate preferably has transparency.

The form of the substrate, which is not particularly limited and can be appropriately selected depending upon the purpose, is preferably a film form.

If the substrate made of a resin is a film, the average thickness of the substrate made of a resin, which is not particularly limited and can be appropriately selected depending upon the purpose, is preferably 5 μm to 1,000 μm and more preferably 50 μm to 500 μm.

The inorganic substrate has a film-like shape, the average thickness of the inorganic substrate, which is not particularly limited and can be appropriately selected upon the purpose, is preferably 0.1 mm to 100 mm.

On the surface of the substrate, letters, patterns and images, etc. may be printed.

On the surface of the substrate, a binder layer may be provided in order to increase close adhesiveness between the substrate and a molding material in forming the anti-fogging and anti-fouling laminate in a molding process or in order to protect the letters, patterns and images from flow resistive pressure of the molding material during a molding process. As the material for the binder layer, binders made of acryl, urethane, polyester, polyamide, ethylene butyl alcohol and an ethylene-vinyl acetate copolymer; and adhesives can be used. Note that the binder layer may be formed of two layers or more. As the binder to be used, a binder having heat-sensitivity and pressure-sensitivity suitable for a molding material can be selected.
<Anti-Fogging and Anti-Fouling Layer>

The surface of the anti-fogging and anti-fouling layer has a pure water contact angle of 90° or more.

The anti-fogging and anti-fouling layer is a cured product obtained by curing the active energy ray curable resin composition through an active energy ray.

The anti-fogging and anti-fouling layer is disposed on the substrate.

The surface of the anti-fogging and anti-fouling layer is flat. Here, the phrase "the surface is flat" means that the surface does not have intentionally formed convex portions or concave portions. For example, regarding the anti-fogging and anti-fouling laminate, when the anti-fogging and anti-fouling layer is formed (the cured product is formed), fine convex portions or concave portions achieved through a physical processing are not formed on the surface.

When the surface of the anti-fogging and anti-fouling layer does not have fine convex portions or concave portions, aqueous stains and/or oily stains (e.g., ink of felt pens, finger prints, sweat, and cosmetics such as foundation cosmetics and UV protectors) hardly adhere to the surface of the anti-fogging and anti-fouling layer. In addition, even if these stains adhere thereto, the stains can easily be removed with a sheet of tissue paper, which makes it possible to obtain a product excellent in persistence of anti-fogging property.

When the surface of the anti-fogging and anti-fouling layer itself has hydrophobicity, the anti-fogging and anti-fouling laminate excellent in abrasion resistance can be obtained compared to the anti-fogging and anti-fouling laminate in which the two layers of the water absorption layer and the protective layer are laminated, as described in Japanese Patent Application Laid-Open No. 2001-233638.

—Pure Water Contact Angle—

The pure water contact angle of the surface of the anti-fogging and anti-fouling layer is 90° or more, preferably 100° or more, more preferably 110° or more, and particularly preferably 115° or more. The upper limit of the pure water contact angle, which is not particularly limited and can be appropriately selected depending upon the purpose, is, for example, 170°.

The pure water contact angle can be measured by the ellipse fitting method by use of, for example, DM-701 (manufactured by Kyowa Interface Science Co., Ltd.) in the following conditions.

Distillation water is placed in a plastic syringe. To the tip of the syringe, a stainless steel needle is attached. The distillation water is allowed to drip on an evaluation surface.

The amount of water to be dripped: 2 μL
The measurement temperature: 25° C.

The contact angle 4 seconds after dripping of water is measured at randomly selected 10 points on the surface of the anti-fogging and anti-fouling layer, and the average value thereof is defined as the pure water contact angle.

—Hexadecane Contact Angle—

The hexadecane contact angle of the surface of the anti-fogging and anti-fouling layer is preferably 30° or more, more preferably 60° or more, still more preferably 70° or more, and particularly preferably 80° or more. The upper limit of the hexadecane contact angle, which is not particularly limited and can be appropriately selected depending upon the purpose, is, for example, 150°. If the hexadecane contact angle falls within the preferable range, advantageously, fingerprints, sebum, sweat, tear, cosmetics, etc. attached on the surface can be easily wiped, and excellent anti-fogging property can be maintained.

The hexadecane contact angle can be measured by the ellipse fitting method by use of DM-701 (manufactured by Kyowa Interface Science Co., Ltd.) in the following conditions.

Hexadecane is placed in a plastic syringe. To the tip of the syringe, a TEFLON coated stainless steel needle is attached. The hexadecane is allowed to drip on an evaluation surface.

The amount of hexadecane to be dripped: 2 μL
The measurement temperature: 25° C.

The contact angle 4 seconds after dripping of hexadecane is measured at randomly selected 10 points on the surface of the anti-fogging and anti-fouling layer, and the average value thereof is defined as the hexadecane contact angle.

The pure water contact angle falling within the aforementioned corresponding range and the hexadecane contact angle falling within the aforementioned corresponding range make it possible to prevent the stains from permeation into the bottom layer of the bulk even when aqueous stains and/or oily stains (e.g., ink of felt pens, finger prints, sweat, and cosmetics such as foundation cosmetics and UV protectors) adhere to the surface of the anti-fogging and anti-fouling layer. Therefore, the stains can easily be wiped through a wipe using a sheet of tissue paper and anti-fogging property returns to an original state that there is no stain.

—Active Energy Ray Curable Resin Composition—

The active energy ray curable resin composition includes at least a hydrophilic monomer having a radically polymerizable unsaturated group (hereinafter, may be referred to as "hydrophilic monomer") and a photopolymerization initiator, preferably includes a hydrophobic monomer having a radically polymerizable unsaturated group (hereinafter, may be referred to as "hydrophobic monomer"). Moreover, the active energy ray curable resin composition includes other components as necessary.

—Hydrophobic Monomer—

Examples of the hydrophobic monomer having a radically polymerizable unsaturated group include monomers including, for example, a radically polymerizable unsaturated group and at least one of fluorine and silicon. Specific examples of such monomers include (meth)acrylates including at least one of fluorine and silicon such as fluorine-containing (meth)acrylates and silicone (meth)acrylates. More specific examples thereof include (meth)acrylates including a fluoroalkyl group, (meth)acrylates to including a fluoroalkyl ether group, and (meth)acrylates including a dimethylsiloxane group.

The hydrophobic monomer is preferably compatible with the hydrophilic monomer.

In the present invention, the (meth)acrylate refers to an acrylate or a methacrylate. The same applies to (meth)acryloyl and (meth)acryl.

The hydrophobic monomer may be a commercially available product.

Examples of commercially available products of the fluorine-containing (meth)acrylates include KY-1200 series manufactured by Shin-Etsu Chemical Co., Ltd., MEGAFACE RS series manufactured by DIC CORPORATION, and OPTOOL DAC manufactured by DAIKIN INDUSTRIES, LTD.

Examples of commercially available products of the silicone (meth)acrylates include X-22-164 series manufactured by Shin-Etsu Chemical Co., Ltd. and TEGO Rad series manufactured by Evonik Co.

The content of the hydrophobic monomer in the active energy ray curable resin composition, which is not particularly limited and can be appropriately selected depending upon the purpose, is preferably more than 0.018% by mass, preferably more than 0.018% by mass but less than 5.0% by mass, more preferably 0.075% by mass to 3.0% by mass, particularly preferably 0.18% by mass to 1.5% by mass. If the content is 5.0% by mass or more, the cured product is excellent in hydrophobicity but is low in the glass transition temperature. As a result, the cured product is too soft and may be reduced in abrasion resistance. Also, the anti-fogging and anti-fouling layer includes a large amount of reaction products of the hydrophobic monomer, which may lead to decreased anti-fogging property to exhalation. Note that, when the active energy ray curable resin composition includes a volatile component (organic solvent etc.), the aforementioned content means a content of the hydrophobic monomer relative to a non-volatile component in the active energy ray curable resin composition.

—Hydrophilic Monomer—

Examples of the hydrophilic monomer having a radically polymerizable unsaturated group include a (meth)acrylate including a polyoxyalkylene chain, a quaternary ammonium salt-containing (meth)acrylate, a tertiary amino group-containing (meth)acrylate, a sulfonic acid group-containing monomer, a carboxylic acid group-containing monomer, a phosphoric acid group-containing monomer and a phosphonic acid group-containing monomer. These may be a monofunctional monomer or a multifunctional monomer.

Examples of the polyoxyalkylene chain include a polyoxyethylene chain and a polyoxypropylene chain. Among them, a polyoxypropylene chain is preferable in terms of excellence in hydrophilicity.

Examples of the hydrophilic monomer include mono- or poly-acrylates or mono- or poly-methacrylates obtained by the reaction between a polyhydric alcohol (polyol or polyhydroxy-containing compound) and a compound selected from the group consisting of an acrylic acid, a methacrylic acid and derivatives thereof. Examples of the polyhydric alcohol include divalent alcohols, trivalent alcohols and quadrivalent or larger valent alcohols. Examples of the divalent alcohols include ethylene glycol, diethylene glycol, triethylene glycol, tetraethylene glycol, polyethylene glycol having a number average molecular weight of 300 to 1,000, propylene glycol, dipropylene glycol, 1,3-propanediol, 1,4-butanediol, 1,5-pentanediol, 1,6-hexanediol, neopentyl glycol, 2-ethyl-1,3-hexane diol, 2,2'-thiodiethanol and 1,4-cyclohexanedimethanol. Examples of the trivalent alcohols include trimethylolethane, trimethylolpropane, pentaglycerol, glycerol, 1,2,4-butanetriol and 1,2,6-hexanetriol. Examples of the quadrivalent or larger valent alcohols include pentaerythritol, diglycerol and dipentaerythritol.

Examples of the (meth)acrylate including a polyoxyalkylene chain include polyethylene glycol (meth)acrylate, polypropylene glycol (meth)acrylate, ethoxylated glycerin (meth)acrylate and ethoxylated pentaerythritol tetra(meth)acrylate. Examples of the polyethylene glycol (meth)acrylate include methoxy polyethylene glycol (meth)acrylate. The molecular weight of a polyethylene glycol unit in the polyethylene glycol (meth)acrylate, which is not particularly limited and can be appropriately selected upon the purpose, is 300 to 1,000, for example. As the methoxy polyethylene glycol (meth)acrylate, a commercially available product can be used. Examples of the commercially available product include MEPM-1000 (manufactured by DKS Co. Ltd.).

Of them, ethoxylated glycerin (meth)acrylate and ethoxylated pentaerythritol tetra(meth)acrylate are preferable because appropriate hardness and hydrophilicity of the antifogging and anti-fouling layer can be satisfied.

Examples of the quaternary ammonium salt-containing (meth)acrylate include
(meth) acryloyloxyethyltrimethylammonium chloride,
(meth)acryloyloxyethyldimethylbenzylammonium chloride,
(meth)acryloyloxyethyldimethylglycidylammonium chloride,
(meth) acryloyloxyethyltrimethylammoniummethyl sulfate,
(meth)acryloyloxydimethylethylammoniumethyl sulfate,
(meth)acryloyloxyethyltrimethylammonium-p-toluene sulfonate,
(meth)acrylamidepropyltrimethylammonium chloride,
(meth)acrylamidepropyldimethylbenzylammonium chloride,
(meth)acrylamidepropyldimethylglycidylammonium chloride,
(meth)acrylamidepropyltrimethylammoniummethyl sulfate,
(meth)acrylamidepropyldimethylethylammoniumethyl sulfate, and
(meth)acrylamidepropyltrimethylammonium-p-toluene sulfonate.

Examples of the tertiary amino group-containing (meth) acrylate include N,N-dimethylaminoethyl(meth)acrylate, N,N-dimethylaminopropyl(meth)acrylamide, diethylaminopropyl(meth)acrylamide, 1,2,2,6,6-pentamethylpiperidyl(meth)acrylate and 2,2,6,6-tetramethylpiperidyl(meth)acrylate.

Examples of the sulfonic acid group-containing monomer include vinylsulfonic acid, allylsulfonic acid, vinyltoluenesulfonic acid, styrenesulfonic acid and sulfonic acid group-containing (meth)acrylate. Examples of the sulfonic acid group-containing (meth)acrylate include sulfoethyl (meth) acrylate, sulfopropyl (meth)acrylate, 2-acrylamide-2-methylpropanesulfonic acid and terminal sulfonic acid modified polyethylene glycol mono(meth)acrylate. These may form salts. Examples of the salts include a sodium salt, a potassium salt, and an ammonium salt.

Examples of the carboxylic acid group-containing monomer include acrylic acid and methacrylic acid.

Examples of the phosphoric acid group-containing monomer include (meth)acrylate having a phosphoric acid ester.

The hydrophilic monomer is preferably a multifunctional hydrophilic monomer.

The molecular weight of the hydrophilic monomer, which is not particularly limited and can be appropriately selected depending upon the purpose, is preferably 200 or more.

The content of the hydrophilic monomer in the active energy ray curable resin composition is 60% by mass or more, preferably 60% by mass to 99.9% by mass, more preferably 63% by mass to 95% by mass, particularly preferably 65% by mass to 90% by mass. Note that, when the active energy ray curable resin composition includes a volatile component (organic solvent etc.), the aforementioned content means a content of the hydrophilic monomer relative to a non-volatile component in the active energy ray curable resin composition.

—Photopolymerization Initiator—

Examples of the photopolymerization initiator include a photoradical polymerization initiator, a photo-acid generating agent, a bisazido compound, hexamethoxymethylmelamine and tetramethoxy glycoluril.

Examples of the photoradical polymerization initiator, which is not particularly limited and can be appropriately selected depending upon the purpose, include ethoxyphenyl (2,4,6-trimethylbenzoyl)phosphine oxide, bis(2,6-dimethylbenzoyl)-2,4,4-trimethylpentylphosphine oxide, bis(2,4,6-trimethylbenzoyl)-2,4,4-trimethylpentylphosphine oxide, bis(2,6-dichlorobenzoyl)-2,4,4-trimethylpentylphosphine oxide, 1-phenyl-2-hydroxy-2-methylpropan-1-one, 1-hydroxycyclohexylphenyl ketone, 1-(4-isopropylphenyl)-2-hydroxy-2-methylpropan-1-one, 1,2-diphenylethanedione and methylphenylglyoxylate.

The content of the photopolymerization initiator in the active energy ray curable resin composition, which is not particularly limited and can be appropriately selected depending upon the purpose, is preferably 0.1% by mass to 10% by mass, more preferably 0.5% by mass to 8% by mass, and particularly preferably 1% by mass to 5% by mass. Note that, when the active energy ray curable resin composition includes a volatile component (organic solvent etc.), the aforementioned content means a content of the photopolymerization initiator relative to a non-volatile component in the active energy ray curable resin composition.

—Other Components—

Examples of the other components, which are not particularly limited and can be appropriately selected depending upon the purpose, include urethane (meth)acrylate, an isocyanuric acid group-containing (meth)acrylate and a filler.

These are sometimes used for controlling elongation percentage and hardness, etc. of the anti-fogging and anti-fouling layer.

Examples of the urethane (meth)acrylate, which is not particularly limited and can be appropriately selected depending upon the purpose, include an aliphatic urethane (meth)acrylate and an aromatic urethane (meth)acrylate. Of them, an aliphatic urethane (meth)acrylate is preferable.

The content of the urethane (meth)acrylate in the active energy ray curable resin composition, which is not particularly limited and can be appropriately selected depending upon the purpose, is preferably 10% by mass to 45% by mass, more preferably 15% by mass to 40% by mass, and particularly preferably 20% by mass to 35% by mass. Note that, when the active energy ray curable resin composition includes a volatile component (organic solvent etc.), the aforementioned content means a content of the urethane (meth)acrylate relative to a non-volatile component in the active energy ray curable resin composition.

Examples of the filler, which is not particularly limited and can be appropriately selected depending upon the purpose, include silica, zirconia, titania, tin oxide, indium tin oxide, antimony-doped tin oxide and antimony pentoxide. Examples of the silica include solid silica and hollow silica.

The active energy ray curable resin composition is diluted with an organic solvent and put in use. Examples of the organic solvent include an aromatic solvent, an alcohol solvent, an ester solvent, a ketone solvent, a glycol ether solvent, a glycol ether ester solvent, a chlorine solvent, an ether solvent, N-methylpyrrolidone, dimethylformamide, dimethylsulfoxide and dimethylacetamide.

The active energy ray curable resin composition is cured by irradiation of an active energy ray. Examples of the active energy ray, which is not particularly limited and can be appropriately selected depending upon the purpose, include an electron beam, a UV ray, an infrared ray, a laser beam, a visible ray, ionizing radiation (X ray, an α ray, a β ray, a γ ray, etc.), a microwave and a high-frequency wave.

The Martens hardness of the anti-fogging and anti-fouling layer, which is not particularly limited and can be appropriately selected depending upon the purpose, is preferably 5 $N/mm^2$ to 300 $N/mm^2$, more preferably 10 $N/mm^2$ to 290 1\7/$mm^2$, and particularly preferably 15 $N/mm^2$ to 280 $N/mm^2$. In molding process of the anti-fogging and anti-fouling laminate, more specifically, in injection molding of a polycarbonate, an anti-fogging and anti-fouling laminate is heated and pressed at 290° C. and at a pressure of 200 MPa. If the Martens hardness is less than 5 $N/mm^2$, the anti-fogging and anti-fouling layer is easily cracked in handling during a production or molding process of the anti-fogging and anti-fouling laminate and in surface cleaning during ordinary use. In contrast, if the Martens hardness exceeds 300 $N/mm^2$, the anti-fogging and anti-fouling layer is sometimes cracked and peels during a molding process. It is advantageous that the Martens hardness falls within the particularly preferable range, since the anti-fogging and anti-fouling laminate can be easily molded into various three-dimensional shapes without deteriorating anti-fogging performance and without producing defects such as a scratch, a crack, and peeling.

Note that after the molding process of the anti-fogging and anti-fouling laminate, since high temperature and high pressure are applied to the anti-fogging and anti-fouling layer in the injection molding step, the Martens hardness of the anti-fogging and anti-fouling layer sometimes increases than before the molding process.

The Martens hardness can be measured, for example, by means of PICODENTOR HM500 (trade name; manufactured by Fischer Instruments K.K.) by applying a load (1 mN/20 s) and using a diamond cone as a needle, at a face angle of 136°.

The pencil hardness of the anti-fogging and anti-fouling layer, which is not particularly limited and can be appropriately selected depending upon the purpose, is preferably B to 4H, more preferably HB to 4H, and particularly preferably F to 4H. If the pencil hardness is less than B (softer than B), the anti-fogging and anti-fouling layer is easily cracked in handling during a production or molding process of the anti-fogging and anti-fouling laminate and in surface cleaning during ordinary use. In contrast, if the pencil hardness exceeds 4H (harder than 4H), the anti-fogging and anti-fouling layer sometimes cracks and peels during a molding process. It is advantageous that the pencil hardness falls within the particularly preferable range, since the anti-fogging and anti-fouling laminate can be easily molded into various three-dimensional shapes without deteriorating anti-fogging performance and without producing defects such as a scratch, a crack, and peeling.

Note that after the molding process of the anti-fogging and anti-fouling laminate, since high temperature and high pressure are applied to the anti-fogging and anti-fouling layer in the injection molding step, the pencil hardness of the anti-fogging and anti-fouling layer sometimes increases than before the molding process. The pencil hardness is measured in accordance with JIS K 5600-5-4.

The average thickness of the anti-fogging and anti-fouling layer, which is not particularly limited and can be appropriately selected depending upon the purpose, is preferably 1 μm to 100 μm, more preferably 4 μm to 50 μm, and particularly preferably 10 μm to 30 μm. The average thickness falling within the preferable range is advantageous because of excellence in anti-fogging property, reduction in the interference irregularity, and excellence in productivity. When the average thickness falls the particularly preferable range, the interference irregularity can be further reduced.

<Other Members>

As other members, an anchor layer, a protective layer, etc. are mentioned.

—Anchor Layer—

The anchor layer is a layer which is disposed between the substrate and the anti-fogging and anti-fouling layer.

Disposition of the anchor layer makes it possible to improve adhesion between the substrate and the anti-fogging and anti-fouling layer.

The refractive index of the anchor layer is preferably close to the refractive index of the anti-fogging and anti-fouling layer in order to prevent interference irregularity. For this reason, the refractive index of the anchor layer falls preferably within ±0.10 of the refractive index of the anti-fogging and anti-fouling layer and more preferably within ±0.05. Alternatively, the refractive index of the anchor layer is preferably between the refractive index of the anti-fogging and anti-fouling layer and the refractive index of the substrate.

The anchor layer can be formed by applying, for example, an active energy ray curable resin composition. That is, the anchor layer is, for example, a cured product obtained by curing the active energy ray curable resin composition through an active energy ray. As the active energy ray curable resin composition, for example, an active energy ray curable resin composition containing at least urethane (meth)acrylate and a photopolymerization initiator, and further containing other components as necessary is mentioned.

As the urethane (meth)acrylate and the photopolymerization initiator, the same examples of the urethane (meth)acrylates and the photopolymerization initiators as described in the section where the anti-fogging and anti-fouling layer is described, are respectively mentioned. Examples of the application method for coating, which is not particularly limited and can be appropriately selected depending upon the purpose, include wire bar coating, blade coating, spin coating, reverse roll coating, die coating, spray coating, roll coating, gravure coating, microgravure coating, lip coating, air knife coating, curtain coating, a comma coat method and a dipping method When the substrate is an inorganic substrate, a material of the anchor layer is, for example, a silane coupling agent, a titanate coupling agent, and an aluminate coupling agent. They preferably include a radically polymerizable unsaturated group.

When the substrate is an inorganic substrate, a method for forming the anchor layer is as follows. That is, a solution dissolving the material is coated on the inorganic substrate and the solvent is dried. Then, a heating treatment is performed at a predetermined time to form the anchor layer.

As the solvent used for the aforementioned solution, a matter dissolving the material is selected. At least one selected from water, alcohols (e.g., methanol, ethanol, n-propanol, i-propanol, n-butanol, i-butanol, sec-butanol and tert-butanol), anones (e.g., cyclohexanone and cyclopentanone), amides (e.g., N,N-dimethylformamide: DMF), and sulfides (e.g., dimethyl sulfoxide: DMSO).

A method of the coating is not particularly limited and a known coating method can be used. Examples of the known method include microgravure coating, wire bar coating, direct gravure coating, die coating, dipping, spray coating, reverse roll coating, curtain coating, comma coating, knife coating, spin-coating, relief printing, off-set printing, gravure printing, intaglio printing, rubber plate printing, screen printing, and inkjet printing.

The heating temperature is, for example, 80° C. or more but 200° C. or less. The heating time is, for example, 1 minute or more but 12 hours or less.

The average thickness of the anchor layer, which is not particularly limited and can be appropriately selected depending upon the purpose, is preferably 1 nm to 100 μm, more preferably 0.01 μm to 10 μm, still more preferably 0.1 μm to 5 μm, and particularly preferably 0.3 μm to 3 μm.

Note that a reflectivity-reducing function and an antistatic function may be imparted to the anchor layer.

—Protective Layer—

The protective layer is a layer to protect the surface of the anti-fogging and anti-fouling layer (the surface where the pure water contact angle is 90° or more).

The protective layer protects the surface when the below-described product is manufactured using the anti-fogging and anti-fouling laminate.

The protective layer is disposed on the surface of the anti-fogging and anti-fouling resin layer.

Examples of the material for the protective layer include similar materials to those for the anchor layer.

The elongation percentage of the anti-fogging and anti-fouling laminate, which is not particularly limited and can be appropriately selected depending upon the purpose, is preferably 10% or more, more preferably 10% to 200% and particularly preferably 40% to 150%. If the elongation percentage is less than 10%, it is sometimes difficult to perform molding processing. It is advantageous that the elongation percentage falls within the particularly preferable range since molding processability is excellent.

The elongation percentage is obtained, for example, by the following method.

The anti-fogging and anti-fouling laminate is cut into rectangular pieces of 10.5 cm in length×2.5 cm in width and used as measurement samples. The tension-elongation percentage of the measurement samples obtained is measured by a tension-tester (autograph AG-5kNX plus, manufactured by Shimadzu Corporation) in measurement conditions (tension rate=100 mm/min; distance between chucks=8 cm). In measurement of the elongation percentage, measurement temperature varies depending upon the type of resin constituting a substrate. The elongation percentage is measured at a temperature near the softening point of the substrate made of a resin or the softening point or more, more specifically, a temperature between 10° C. to 250° C. For example, if the resin substrate is made of polycarbonate or a PC/PMMA laminate, the elongation percentage is preferably measured at 150° C.

It is preferable that the anti-fogging and anti-fouling laminate has a small difference in rate of in-plane heat shrinkage between the X direction and the Y direction. The X direction and the Y direction of the anti-fogging and anti-fouling laminate are defined as follows. For example, if the anti-fogging and anti-fouling laminate is a roll, the X direction and the Y direction correspond to the longitudinal direction and the width direction of the roll, respectively. It is preferable that the difference in rate of heat shrinkage between the X direction and the Y direction of the anti-fogging and anti-fouling laminate at the heating temperature employed in the heating step during molding, falls within 5%. If the difference is outside the range, the anti-fogging and anti-fouling layer is peeled and cracked during a molding process, and letters, patterns and images printed on the surface of a substrate made of a resin deform or shift in position, with the result that it becomes sometimes difficult to apply a molding process.

The anti-fogging and anti-fouling laminate is a film particularly suitable for thermal bending, in-mold forming, insert molding, and overlay.

As a method for manufacturing the anti-fogging and anti-fouling laminate, which is not particularly limited and can be appropriately selected depending upon the purpose, a method for manufacturing the anti-fogging and anti-fouling laminate (described later) is preferable.

<Method for Manufacturing Anti-Fogging and Anti-Fouling Laminate>

The method for manufacturing the anti-fogging and anti-fouling laminate includes at least: an uncured resin layer forming step, and an anti-fogging and anti-fouling layer forming step; and further includes other steps as necessary.

The method for manufacturing the anti-fogging and anti-fouling laminate is a method for manufacturing the anti-fogging and anti-fouling laminate of the present invention.

<<Uncured Resin Layer Forming Step>>

The uncured resin layer forming step is not particularly limited and can be appropriately selected depending upon the purpose, as long as the step is a step of coating an active energy ray curable resin composition on a substrate to form an uncured resin layer.

Examples of the substrate, which is not particularly limited and can be appropriately selected depending upon the purpose, include examples of the substrate described in the section where the anti-fogging and anti-fouling laminate of the present invention is described.

Examples of the active energy ray curable resin composition, which is not particularly limited and can be appropriately selected depending upon the purpose, include examples of the active energy ray curable resin composition described in the section where the anti-fogging and anti-fouling layer for the anti-fogging and anti-fouling laminate of the present invention is described.

The uncured resin layer is formed by coating the active energy ray curable resin composition on the substrate and drying the composition as necessary. The uncured resin layer may be a solid film or a film having flowability due to a curable component of low molecular weight contained in the active energy ray curable resin composition.

Examples of the application method for coating, which is not particularly limited and can be appropriately selected depending upon the purpose, include wire bar coating, blade coating, spin coating, reverse roll coating, die coating, spray coating, roll coating, gravure coating, microgravure coating, lip coating, air knife coating, curtain coating, a comma coat method and a dipping method.

The uncured resin layer remains uncured since the layer is not irradiated with an active energy ray.

In the uncured resin layer forming step, if an anchor layer is formed on the substrate, the active energy ray curable resin composition may be coated on the anchor layer to form the uncured resin layer.

Examples of the anchor layer, which is not particularly limited and can be appropriately selected depending upon the purpose, include examples of the anchor layers described in the section where the anti-fogging and anti-fouling laminate of the present invention is described.

<Anti-Fogging and Anti-Fouling Layer Forming Step>>

The anti-fogging and anti-fouling layer forming step, which is not particularly limited and can be appropriately selected depending upon the purpose, so long as it is a step of irradiating the uncured resin layer with an active energy ray and then curing the uncured resin layer to form an anti-fogging and anti-fouling layer.

When the anti-fogging and anti-fouling layer is formed, a physical processing for forming fine convex portions or fine concave portions on the surface is not performed.

When the active energy curable resin composition includes the hydrophobic monomer and the hydrophilic monomer, the low-surface-energy components are localized on the surface of the anti-fogging and anti-fouling layer obtained, and the hydrophilic components (water-absorbable components) are present inside the anti-fogging and anti-fouling layer. As a result, water droplets are easily repelled on the surface of the anti-fogging and anti-fouling layer, and water moisture is easily trapped inside the anti-fogging and anti-fouling layer, which makes it possible to achieve more excellent anti-fogging property.

Active Energy Ray—

The active energy ray is not particularly limited and can be appropriately selected depending upon the purpose, as long as the uncured resin layer can be cured by the active energy ray. Examples of the active energy ray include those described in the section where the anti-fogging and anti-fouling laminate of the present invention is described.

(Active Energy Ray Curable Resin Composition)

An active energy ray curable resin composition of the present invention includes at least a hydrophilic monomer having a radically polymerizable unsaturated group, a hydrophobic monomer having a radically polymerizable unsaturated group, and a photopolymerization initiator, and further includes other components as necessary.

A pure water contact angle of the surface of the anti-fogging and anti-fouling layer, which is obtained by curing the active energy ray curable resin composition through an active energy ray, is 90° or more. The pure water contact angle of the surface of the anti-fogging and anti-fouling layer can be measured, for example, by preparing the anti-fogging and anti-fouling layer having an average thickness of 4 μm and measuring it by the aforementioned measurement method. Examples of properties of the anti-fogging and anti-fouling layer include those described in the section where the anti-fogging and anti-fouling laminate is described. Examples of preferable aspects of the properties include those described in the section where the anti-fogging and anti-fouling laminate is described.

Examples of the components of the active energy ray curable resin composition include the components of the active energy ray curable resin composition described in the section where the anti-fogging and anti-fouling laminate is described. Examples of preferable aspects include aspects described in the section where the anti-fogging and anti-fouling laminate is described.

That is, examples of the hydrophilic monomer having a radically polymerizable unsaturated group include the hydrophilic monomers having a radically polymerizable unsaturated group described in the section where the anti-fogging and anti-fouling laminate is described. Preferable examples of the content thereof etc. include the aspects described in the section where the anti-fogging and anti-fouling laminate is described.

Examples of the hydrophobic monomer having a radically polymerizable unsaturated group include the hydrophobic monomers having a radically polymerizable unsaturated group described in the section where the anti-fogging and anti-fouling laminate is described. Preferable examples of the content thereof etc. include the aspects described in the section where the anti-fogging and anti-fouling laminate is described.

(Product)

The product of the present invention has the anti-fogging and anti-fouling laminate of the present invention as a surface and further has other members as necessary.

Examples of the product, which is not particularly limited and can be appropriately selected depending upon the purpose, include glass windows, refrigerating/freezing show case, window materials for automobile windows, bath mirrors, mirrors such as automobile side mirrors, floors and walls of bath rooms, solar battery panels and security/surveillance cameras.

The product may be a pair of glasses, goggles, head-gears, lenses, microlens arrays, and headlight covers, front panels, side panels and rear panels of automobiles. These are preferably formed by in-mold forming, insert molding or overlay molding.

The anti-fogging and anti-fouling laminate may be used as a part or whole of the surface of the product.

A method for manufacturing the product is not particularly limited and can be appropriately selected depending upon the purpose; however, the method for manufacturing the product of the present invention (described later) is preferable.

(Method for Manufacturing the Product)

The method for manufacturing the product of the present invention includes at least a heating step, and an anti-fogging and anti-fouling laminate molding step, and further includes other steps (injection molding step, cast molding step, etc.) if necessary.

The method for manufacturing the product is the method for manufacturing the product of the present invention.

<Heating Step>

The heating step is not particularly limited and can be appropriately selected depending upon the purpose as long as it is a step of heating an anti-fogging and anti-fouling laminate.

The anti-fogging and anti-fouling laminate is the anti-fogging and anti-fouling laminate of the present invention.

The heating is not particularly limited and can be appropriately selected depending upon the purpose; however, infrared heating or exposure to a high temperature atmosphere is preferable.

The heating temperature is not particularly limited and can be appropriately selected depending upon the purpose; however, the heating temperature is preferably near the glass transition temperature of the substrate made of a resin or the glass transition temperature or more.

The heating time is not particularly limited and can be appropriately selected depending upon the purpose.

<Anti-Fogging and Anti-Fouling Laminate Molding Step>

The anti-fogging and anti-fouling laminate molding step is not particularly limited and can be appropriately selected depending upon the purpose as long as it is a step of molding the heated anti-fogging and anti-fouling laminate into a desired shape. The anti-fogging and anti-fouling laminate molding step is, for example, a step of bringing the laminate into contact with a predetermined mold and molding the laminate into a desired shape by application of air pressure.

<Injection Molding Step>

After the anti-fogging and anti-fouling laminate molding step, an injection molding step may be performed as necessary.

The injection molding step is not particularly limited and can be appropriately selected depending upon the purpose as long as it is a step of injecting a molding material onto a substrate made of a resin of the anti-fogging and anti-fouling laminate molded into a desired shape and molding the molding material.

As the molding material, for example, a resin is mentioned. Examples of the resin include olefin resins, styrene resins, ABS resins (acrylonitrile-butadiene-styrene copolymers), AS resins (acrylonitrile-styrene copolymers), acrylic resins, urethane resins, unsaturated polyester resins, epoxy resins, polyphenylene oxide/polystyrene resins, polycarbonates, polycarbonate modified polyphenylene ethers, polyethylene terephthalates, polysulfones, polyphenylene sulfides, polyphenylene oxides, polyetherimides, polyimides, polyamides, liquid crystal polyesters, polyallyl heat-resistant resins, various types of complex resins and various types of modified resins.

The injection method is not particularly limited and can be appropriately selected depending upon the purpose. The injection method, for example, a method of injecting a molten molding material to a substrate made of a resin of the anti-fogging and anti-fouling laminate which is brought into contact with a predetermined die.

<Cast Molding Step>

After the anti-fogging and anti-fouling laminate molding step, a cast molding step may be performed as necessary.

The cast molding step is not particularly limited and can be appropriately selected depending upon the purpose, so long as it is the following step. That is, resin materials dissolved in a solution are charged into a side of the substrate made of a resin of the anti-fogging and anti-fouling laminate, which is molded into a desired shape. Then, the resin materials are solidified to perform the molding.

The method for manufacturing the product is preferably performed by use of an in-mold forming apparatus, an insert-molding apparatus, or an overlay molding apparatus.

Herein, an example of the method for manufacturing the product of the present invention will be described with reference to the accompanying drawings. The manufacturing method is a manufacturing method using an in-mold forming apparatus.

First, an anti-fogging and anti-fouling laminate 500 is heated. The heating is preferably performed by infrared heating or exposure to a high temperature atmosphere.

Then, as shown in FIG. 1A, the anti-fogging and anti-fouling laminate 500 heated is disposed at a predetermined position between a first mold 501 and a second mold 502 in such a manner that the substrate made of a resin of the anti-fogging and anti-fouling laminate 500 faces the first mold 501; whereas the anti-fogging and anti-fouling layer faces the second mold 502. In FIG. 1A, the first mold 501 is immovable; whereas the second mold 502 is movable.

Figure 1B:
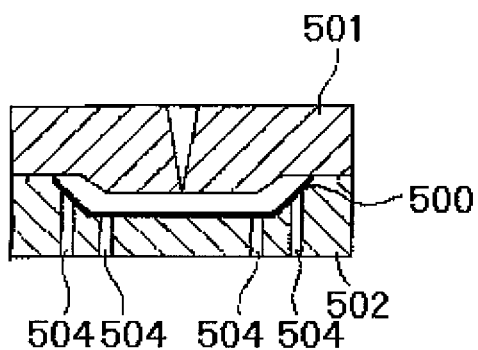
FIG. 1B is a process drawing for describing an example of manufacturing a product of the present invention by in-mold molding.
Figure 1C:
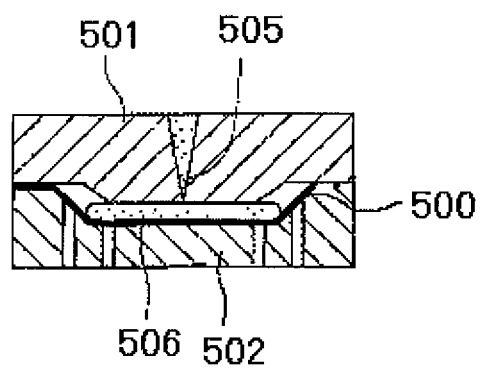
FIG. 1C is a process drawing for describing an example of manufacturing a product of the present invention by in-mold molding.
Figure 1D:
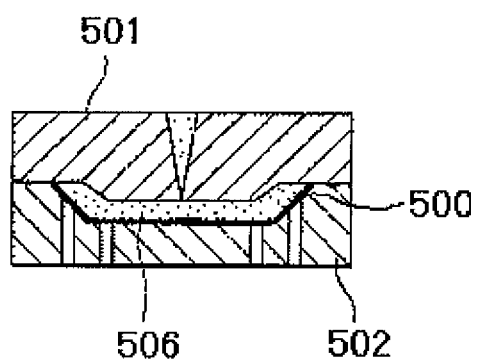
FIG. 1D is a process drawing for describing an example of manufacturing a product of the present invention by in-mold molding.

After the anti-fogging and anti-fouling laminate 500 is disposed between the first mold 501 and the second mold 502, the first mold 501 and the second mold 502 are clamped. Subsequently, air is suctioned through a suction hole 504 having an opening in the cavity surface of the second mold 502 to fit the anti-fogging and anti-fouling laminate 500 along the cavity surface of the second mold 502. In this manner, the cavity surface is shaped by the anti-fogging and anti-fouling laminate 500. At this time, the periphery of the anti-fogging and anti-fouling laminate 500 may be immobilized by a film fixation mechanism (not shown) to set the anti-fogging and anti-fouling laminate. Thereafter, unnecessary portion of the anti-fogging and anti-fouling laminate 500 is trimmed away (FIG. 1B).

Note that if the second mold 502 has no suction hole 504 and the first mold 501 has a hole (not shown), pressurized air is fed through the hole of the first mold 501 toward the anti-fogging and anti-fouling laminate 500 to fit the anti-fogging and anti-fouling laminate 500 along the cavity surface of the second mold 502.

Subsequently, to the substrate made of a resin of the anti-fogging and anti-fouling laminate 500, a molten molding material 506 is injected through a gate 505 of the first mold 501 and poured in the cavity, which is formed of the first mold 501 and the second mold 502 by clamping (FIG. 10). In this manner, the cavity is charged with the molten molding material 506 (FIG. ID). After completion of charge with the molten molding material 506, the molten molding material 506 is cooled to a predetermined temperature and solidified.

Figure 1E:
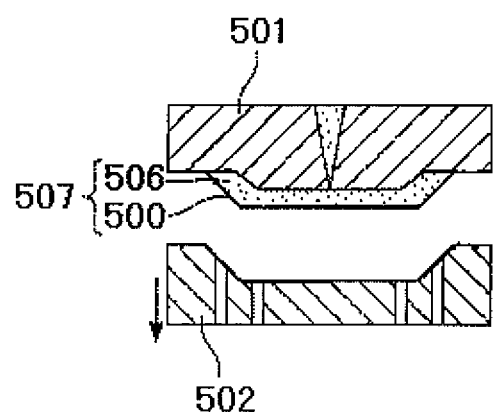
FIG. 1E is a process drawing for describing an example of manufacturing a product of the present invention by in-mold molding.
Figure 1F:
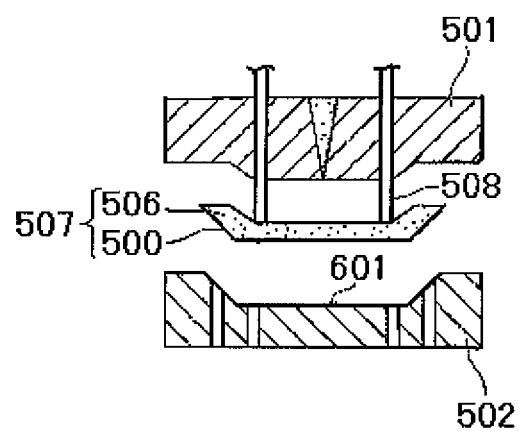
FIG. 1F is a process drawing for describing an example of manufacturing a product of the present invention by in-mold molding.

Thereafter, the second mold 502 is moved to separate the first mold 501 and the second mold 502 (FIG. 1E). In this manner, the anti-fogging and anti-fouling laminate 500 is attached to the surface of the molding material 506 and a product 507 molded into a desired shape by in-mold forming can be obtained.

Finally, ejection pins 508 are pressed to remove the obtained product 507 from the first mold 501.

The manufacturing method using an overlay molding apparatus is as follows. This is a process of directly decorating the surface of a molding material with the anti-fogging and anti-fouling laminate, and one example thereof is TOM (Three dimension Overlay Method). Next, one example of the method for manufacturing the product of the present invention using the TOM will be described.

First, both spaces of an apparatus that is partitioned by the anti-fogging and anti-fouling laminate fixed in a fixing frame are vacuumed by sucking the air in the spaces with, for example, a vacuum pump.

At this time, a molding material previously formed by injection molding is placed in one of the spaces. At the same time, the anti-fogging and anti-fouling laminate is heated with an infrared heater until the temperature reaches a predetermined temperature at which the anti-fogging and anti-fouling laminate starts to soften. At the timing when the anti-fogging and anti-fouling laminate has been heated to soften, the anti-fogging and anti-fouling laminate is brought into contact with the three dimensional shape of the molding material under vacuum by feeding air into the space of the apparatus where the molding material is absent. If necessary, pressing with compressed air may further be employed in combination by feeding the compressed air to the space into which the air has been fed. After the anti-fogging and anti-fouling laminate has been brought into contact with the molding product, the resultant decorated molding product is removed from the fixing frame. This vacuum molding is generally carried out at 80° C. to 200° C., preferably at about 110° C. to about 160° C.

Upon overlay molding, in order to achieve adhesion between the anti-fogging and anti-fouling laminate and the molding material, an adhesive layer may be provided on the surface of the anti-fogging and anti-fouling laminate opposite to the anti-fogging and anti-fouling surface thereof. The adhesive layer is not particularly limited and can be appropriately selected depending upon the purpose. Examples of the adhesive layer include acrylic adhesives and hot-melt adhesives. The method for forming the adhesive layer is not particularly limited and can be appropriately selected depending upon the purpose. In one exemplary method for forming the adhesive layer, after the anti-fogging and anti-fouling layer has been formed on the substrate made of a resin, a coating liquid for forming an adhesive layer is coated on the surface of the substrate made of a resin opposite to the surface thereof that has been provided with the anti-fogging and anti-fouling layer, to thereby form the adhesive layer. In another employable method, a coating liquid for forming an adhesive layer is coated on a release sheet to form the adhesive layer, and then the substrate made of a resin and the adhesive layer on the release sheet are laminated on top of each other, to thereby laminate the adhesive layer on the substrate made of a resin.

Here, an example of the product of the present invention will be described with reference to the drawings.

FIG. 2 to FIG. 5 are each a schematic cross sectional view of an example of the product of the present invention.

Figure 2:
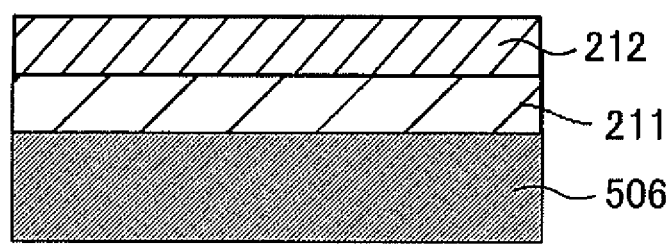
FIG. 2 is a schematic cross sectional view of an example of a product of the present invention (part 1)

The product of FIG. 2 includes a molding material 506, a substrate made of a resin 211, and an anti-fogging and anti-fouling layer 212, where the substrate made of a resin 211 and the anti-fogging and anti-fouling layer 212 are laminated on the molding material 506 in this order.

This product can be manufactured by, for example, insert molding.

Figure 3:
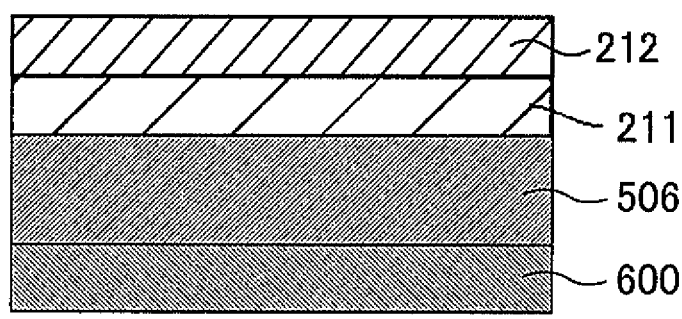
FIG. 3 is a schematic cross sectional view of an example of a product of the present invention (part 2)

The product of FIG. 3 includes a molding material 506, a substrate made of a resin 211, an anti-fogging and anti-fouling layer 212, and a hard coat layer 600, where the substrate made of a resin 211 and the anti-fogging and anti-fouling layer 212 are laminated on the molding material 506 in this order. The hard coat layer 600 is formed at the side of the molding material 506 opposite to the side where the substrate made of a resin 211 is present.

This product can be obtained by the following method. Specifically, after the product of FIG. 2 is manufactured, a protective layer is formed on an anti-fogging and anti-fouling layer 212. Then, a molding material 506 is immersed in a hard coat solution and is subjected to, for example, drying and curing to form a hard coat layer 600 on the surface of the molding material 506. Then, the protective layer is removed to obtain the product. Here, the hard coat layer 600 is obtained by immersing the molding material 506 in a hard coat solution and drying and curing it. Note that, if the anti-fogging and anti-fouling layer has a flat surface and has both the pure water contact angle falling within the aforementioned corresponding range and the hexadecane contact angle falling within the aforementioned corresponding range, it is not necessary to form the protective layer. The reason for this is as follows. Specifically, the anti-fogging and anti-fouling layer repels the hard coat solution. Therefore, the hard coat is not formed on the anti-fogging and anti-fouling layer and the hard coat layer 600 is formed only on a side opposite to the side of the substrate made of a resin 211 of the molding material 506. Therefore, the product is excellent in productivity.

Figure 4:
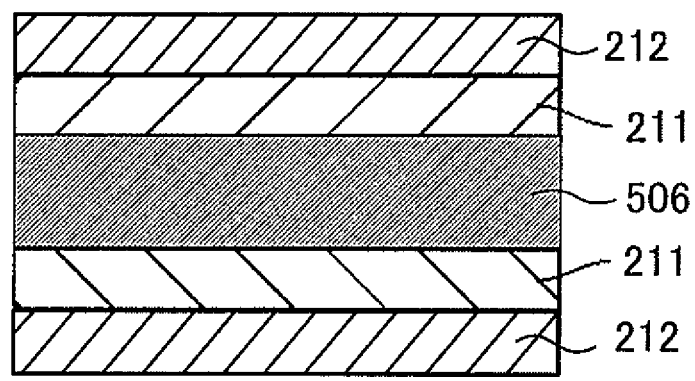
FIG. 4 is a schematic cross sectional view of an example of a product of the present invention (part 3)

The product of FIG. 4 includes a molding material 506, substrates made of a resin 211, and anti-fogging and anti-fouling layers 212, where each of the substrates made of a resin 211 and each of the anti-fogging and anti-fouling layers 212 are laminated on either side of the molding material 506 in this order.

Figure 5:
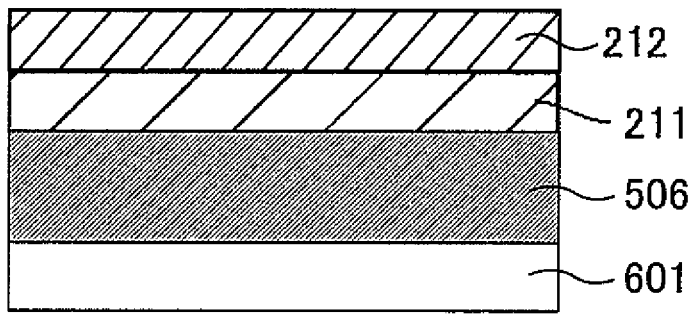
FIG. 5 is a schematic cross sectional view of an example of a product of the present invention (part 4).

The product of FIG. 5 includes a molding material 506, a substrate made of a resin 211, an anti-fogging and anti-fouling layer 212, and an optical film 601, where the substrate made of a resin 211 and the anti-fogging and anti-fouling layer 212 are laminated on the molding material 506 in this order. The optical film 601 is formed at the side of the molding material 506 opposite to the side where the substrate made of a resin 211 is present. Examples of the optical film 601 include a hard coat film, an anti-reflection film, an anti-glare film, and a polarizing film.

The product illustrated in FIG. 4 or FIG. 5 can be manufactured by, for example, double insert molding. Double insert molding is a method for molding a monolithic product with films laminated on both surfaces, and can be performed using, for example, the method described in Japanese Patent Application Laid-Open No. 03-114718.

(Anti-Fouling Method)

The anti-fouling method of the present invention is a method for protecting the product from dirt by laminating the anti-fogging and anti-fouling laminate of the present invention onto the surface of a product.

Examples of the product, which is not particularly limited and can be appropriately selected depending upon the purpose, include glass windows, refrigerating/freezing show case, window materials for automobile windows, bath mirrors, mirrors such as automobile side mirrors, floors and walls of bath rooms, solar battery panels and security/surveillance cameras.

The product may be a pair of glasses, goggles, head-gears, lenses, microlens arrays, and headlight covers, front panels, side panels and rear panels of automobiles. These are preferably formed by in-mold forming and insert molding.

The method for laminating the anti-fogging and anti-fouling laminate onto the surface of a product is not particularly limited and can be appropriately selected depending upon the purpose. For example, a method for attaching the anti-fogging and anti-fouling laminate to a surface of the product is mentioned. The anti-fogging and anti-fouling laminate can be laminated onto a surface of the product also by the method for manufacturing the product of the present invention.

EXAMPLES

Now, Examples of the present invention will be described; however the present invention is not limited to these Examples.

<Pure Water Contact Angle>

The pure water contact angle was measured by the ellipse fitting method by use of a contact angle meter, DM-701 (manufactured by Kyowa Interface Science Co., Ltd.) in the following conditions.

Distillation water was placed in a plastic syringe. To the tip of the syringe, a stainless steel needle was attached. The distillation water was allowed to drip on an evaluation surface.

The amount of water to be dripped: 2 μL

The measurement temperature: 25° C.

The contact angle 4 seconds after dripping of water was measured at randomly selected 10 points on the surface of the anti-fogging and anti-fouling layer, and the average value thereof was defined as the pure water contact angle.

<Hexadecane Contact Angle>

The hexadecane contact angle was measured by the ellipse fitting method by use of a contact angle meter, DM-701 (manufactured by Kyowa Interface Science Co., Ltd.) in the following conditions.

Hexadecane was placed in a plastic syringe. To the tip of the syringe, a TEFLON coated stainless steel needle was attached. The hexadecane was allowed to drip on an evaluation surface.

The amount of hexadecane to be dripped: 2 μL

The measurement temperature: 25° C.

The contact angle 4 seconds after dripping of hexadecane was measured at randomly selected 10 points on the surface of the anti-fogging and anti-fouling layer, and the average value thereof was defined as the hexadecane contact angle.

<Anti-Fogging Property to Exhalation>

Immediately after the surface of the anti-fogging and anti-fouling layer was strongly breathed once from a place 5 cm apart from the surface in the normal line direction under an environment of 25° C. and 37% RH, the surface was visually observed and evaluated according to the following evaluation criteria.

[Evaluation Criteria]

A: There was no change in appearance of the surface of the anti-fogging and anti-fouling layer.

C: Changes in appearance, such as white cloud and formation of a film of water, were observed on the surface of the anti-fogging and anti-fouling layer.

<Test of Anti-Fouling Property>

A commercially available permanent marker (permanent marker: Mckee, manufactured by ZEBRA) was brought into contact with the surface of the anti-fogging and anti-fouling layer. Then, a state of ink (repellence) on the surface of the anti-fogging and anti-fouling layer was visually observed and was evaluated based on the following evaluation criteria.

[Evaluation Criteria]

A: Ink is repelled.

C: Ink adheres.

<Test of Wiping Property>

A commercially available permanent marker (permanent marker: Mckee, manufactured by ZEBRA) was brought into contact with the surface of the anti-fogging and anti-fouling layer. Then, the ink on the surface of the anti-fogging and anti-fouling layer was wiped with a sheet of tissue paper (manufactured by DAIO PAPER CORPORATION, ELLEAIR) three times in a circular motion. After that, the state of the surface was visually observed and the test of anti-fogging property to exhalation was performed. Evaluations were performed based on the following evaluation criteria.

[Evaluation Criteria]

A: Ink could be wiped and there was no change in appearance of the surface of the anti-fogging and anti-fouling layer after the exhalation test.

C: Ink could not be wiped; and/or changes in appearance, such as white cloud and formation of a film of water, were observed on the surface of the anti-fogging and anti-fouling layer.

Example 1

Preparation of Anti-Fogging and Anti-Fouling Laminate

As the substrate made of a resin, FE-2000 (PC substrate, average thickness of 180 μm, manufactured by MITSUBISHI GAS CHEMICAL COMPANY, INC.) was used.

Next, an active energy ray curable resin composition having the following formulation was coated on the substrate made of a resin so that a thickness of the coating was 4 μm. A metal halide lamp was used to emit an ultraviolet ray at a radiation dose of 1,800 mJ/cm$^2$ under nitrogen atmosphere and cure the resultant anti-fogging and anti-fouling layer to obtain an anti-fogging and anti-fouling laminate.

| -Active energy ray curable resin composition (total: 100% by mass)- | |
|---|---|
| NK ESTER A-GLY-20E (manufactured by Shin Nakamura Chemical Co., Ltd.) | 67.307% by mass |
| PETIA (manufactured by DAICEL-ALLNEX LTD.) | 28.846% by mass |
| KY1203 (manufactured by Shin-Etsu Chemical Co., Ltd.) | 0.962% by mass |
| IRGACURE 184D (manufactured by BASF) | 2.885% by mass |

The anti-fogging and anti-fouling laminate obtained was applied to the aforementioned evaluations. Results were presented in Table 1-1.

Examples 2 to 8 and Comparative Examples 1 to 4

A laminate (of anti-fogging and anti-fouling) was obtained in the same manner as in Example 1 except that the thickness of the coating and the formulation of the active energy ray curable resin composition were changed to each thickness of the coating and each formulation of the active energy ray curable resin composition described in Table 1-1 and Table 1-2.

The laminates (of anti-fogging and anti-fouling) obtained were applied to the aforementioned evaluations. Results were presented in Table 1-1 and Table 1-2.

Comparative Example 5

The substrate made of a resin and the active energy ray curable resin composition having the formulation described in Table 1-2 were used to obtain a laminate having a fine uneven structure by a method for manufacturing the fine uneven structure using a glass roll matrix described in Example 1 of Japanese Patent Application Laid-Open No. 2014-159154.

Here, the fine uneven structure of the laminate obtained was the same as the fine uneven structure on the resin layer, which had been described in Example 1 of [Table 2] in paragraph [0177] of Japanese Patent Application Laid-Open No. 2014-159154.

The laminate obtained was applied to the aforementioned evaluations. Results were presented in Table 1-2.

TABLE 1-1

|  |  | Example 1 | Example 2 | Example 3 | Example 4 | Example 5 | Example 6 |
|---|---|---|---|---|---|---|---|
| Hydrophilic monomers | NK ESTER A-GLY-20E | 67.307 | 76.922 | 86.538 | — | 67.307 | 67.307 |
|  | NK ESTER A-TM-35E | — | — | — | 67.307 | — | — |
|  | NK ESTER A-600 | — | — | — | — | — | — |
| Other monomers | PETIA | 28.846 | 19.231 | 9.615 | 28.846 | — | — |
|  | EBECRYL 40 | — | — | — | — | 28.846 | 28.846 |
|  | ARONIX M313 | — | — | — | — | — | — |
| Hydrophobic monomers | KY1203 | 0.962 | 0.962 | 0.962 | 0.962 | 0.962 | — |
|  | OPTOOL DAC-HP | — | — | — | — | — | 0.962 |
| Initiator | IRGACURE 184D | 2.885 | 2.885 | 2.885 | 2.885 | 2.885 | 2.885 |
|  | Total (% by mass) | 100 | 100 | 100 | 100 | 100 | 100 |
|  | Thickness of the coating (μm) | 4 | 4 | 4 | 4 | 4 | 4 |
| Contact angle (°) | Pure water | 115.11 | 114.75 | 114.38 | 115.4 | 115.03 | 107.1 |
|  | Hexadecane | 67.62 | 67.47 | 67.66 | 67.63 | 67.76 | 66.6 |
|  | Anti-fogging property to exhalation | A | A | A | A | A | A |
|  | Test of anti-fouling property | A | A | A | A | A | A |
|  | Test of wiping property | A | A | A | A | A | A |

TABLE 1-2

|  |  | Example 7 | Example 8 | Comparative Example 1 | Comparative Example 2 | Comparative Example 3 | Comparative Example 4 | Comparative Example 5 |
|---|---|---|---|---|---|---|---|---|
| Hydrophilic monomers | NK ESTER A-GLY-20E | 67.936 | 67.911 | 67.961 | 57.691 | 57.691 | 67.949 | — |
|  | NK ESTER A-TM-35E | — | — | — | — | — | — | — |
|  | NK ESTER A-600 | — | — | — | — | — | — | 67.307 |
| Other monomers | PETIA | — | — | 29.126 | 38.462 | — | — | — |
|  | EBECRYL 40 | 29.116 | 29.105 | — | — | 38.462 | 29.121 | — |
|  | ARONIX M313 | — | — | — | — | — | — | 28.846 |
| Hydrophobic monomers | KY1203 | 0.036 | 0.073 | 0.000 | 0.962 | 0.962 | 0.018 | 0.962 |
|  | OPTOOL DAC-HP | — | — | — | — | — | — | — |
| Initiator | IRGACURE 184D | 2.912 | 2.911 | 2.913 | 2.885 | 2.885 | 2.912 | 2.885 |
|  | Total (% by mass) | 100 | 100 | 100 | 100 | 100 | 100 | 100 |
|  | Thickness of the coating (μm) | 20 | 20 | 4 | 4 | 4 | 20 | 2.5 |
| Contact angle (°) | Pure water | 94.9 | 112.5 | 53.91 | 115.4 | 114.4 | 83.9 | 120 |
|  | Hexadecane | 45.7 | 36.0 | — | 67.69 | 67.4 | 62.5 | 84 |
|  | Anti-fogging property to exhalation | A | A | A | C | C | A | A |
|  | Test of anti-fouling property | A | A | C | A | A | C | C |
|  | Test of wiping property | A | A | C | A | A | C | C |

In Table 1-1 and Table 1-2, a unit of each component is represented by % by mass.

Each material in Table 1-1 and Table 1-2 is as follows.
[Hydrophilic Monomer]
NK ESTER A-GLY-20E: manufactured by Shin Nakamura Chemical Co., Ltd.
Ethoxylated glycerin triacrylate
(the total number of a repeating unit of a polyethylene oxide chain included in the structure: 20)
NK ESTER A-TM-35E: manufactured by Shin Nakamura Chemical Co., Ltd.
Ethoxylated pentaerythritol tetraacrylate
(the total number of a repeating unit of a polyethylene oxide chain included in the structure: 35)
NK ESTER A-600: manufactured by Shin Nakamura Chemical Co., Ltd.
Polyethylene glycol diacrylate
(the total number of a repeating unit of a polyethylene oxide chain included in the structure: 14)
[Other Monomers]
PETIA: manufactured by DAICEL-ALLNEX LTD.
Mixture of pentaerythritol triacrylate and pentaerythritol tetraacrylate
(a polyethylene oxide chain included in the structure: absence)
EBECRYL 40: manufactured by DAICEL-ALLNEX LTD.
Pentaerythritol ethoxy tetraacrylate
(a polyethylene oxide chain included in the structure: absence)
ARONIX M313: manufactured by Toagosei Company, Limited
Acrylate including an isocyanuric acid group
[Hydrophobic Monomer]
KY-1203: manufactured by Shin-Etsu Chemical Co., Ltd.
End-type (meth)acryl modified perfluoropolyether-based additive
OPTOOL DAC-HP: manufactured by DAIKIN INDUSTRIES, LTD
End-type (meth)acryl modified perfluoropolyether-based additive
[Initiator]
IRGACURE 184D: manufactured by BASF In Examples 1 to 8, the anti-fogging and anti-fouling layers have a hydrophilic molecular structure. When a surface of the anti-fogging and anti-fouling layer had a pure water contact angle of 90° or more and the anti-fogging and anti-fouling layer had a hydrophilic molecular structure, the anti-fogging and anti-fouling laminate excellent in the anti-fogging property to exhalation and the anti-fouling property could be obtained.

In Comparative Example 1, absence of the hydrophobic monomer resulted in a pure water contact angle of less than 90°, and thus the laminate was deteriorated in the fouling property and the wiping property.

In Comparative Examples 2 to 3, due to the small content of the hydrophilic monomer, these laminates were deteriorated in the anti-fogging property to exhalation.

In Comparative Example 4, the surface thereof had a pure water contact angle of less than 90°, and thus the laminate was deteriorated in the fouling property and the wiping property.

In Comparative Example 5, a predetermined amount of the hydrophilic monomer was included and the surface thereof had a pure water contact angle of 90° or more. However, the surface thereof had an uneven structure, and thus the laminate was deteriorated in the anti-fouling property and the wiping property.

Example 9

An anti-fogging and anti-fouling laminate was obtained in the same manner as in Example 5 except that the thickness of the coating was changed to 10 μm.

The anti-fogging and anti-fouling laminate obtained was evaluated in the same manner as in Example 5. Moreover, the interference irregularity was evaluated. Results are presented in Table 2. The interference irregularity of Example 5 presented an evaluation result of B, while that of Example 9 presented an evaluation result of A.

<Method for Evaluating Interference Irregularity>

The anti-fogging and anti-fouling laminate and the black acrylic board (manufactured by MITSUBISHI RAYON CO., LTD., product name: ACRYLITE) were attached together using a piece of double-coated adhesive tape (manufactured by NISSHO CORPORATION, product name: LUCIACS CS9621T) so that a surface to be evaluated (i.e., a surface of the anti-fogging and anti-fouling laminate) faced upward. Then, the surface to be evaluated was observed under a white fluorescent lamp and was evaluated based on the following evaluation criteria.

[Evaluation Criteria]
A: The surface to be evaluated was black and the interference irregularity was not observed
B: The surface to be evaluated colored slightly and the interference irregularity was slightly observed.
C: The surface to be evaluated turned, for example, green or red and the interference irregularity was observed.

TABLE 2

|  | Example 5 | Example 9 |
| --- | --- | --- |
| Thickness of the coating (μm) | 4 | 10 |
| Contact angle (°) Pure water | 115.03 | 115 |
| Contact angle (°) Hexadecane | 67.76 | 67 |
| Anti-fogging property to exhalation | A | A |
| Test of anti-fouling property | A | A |
| Test of wiping property | A | A |
| Interference irregularity | B | A |

Example 10

The anti-fogging and anti-fouling laminate prepared in Example 9 was exposed to the atmosphere of 400° C. for 13 seconds and was molded into an 8 curve lens (diameter: 80 mm) so that a concave surface was the anti-fogging and anti-fouling layer through vacuum molding. The anti-fogging and anti-fouling layer did not have any poor appearance such as scratch, crack and peering. Then, the anti-fogging and anti-fouling laminate having an 8 curve lens (diameter: 80 mm) was subjected to punching with a Tomson blade. The mater that had undergone the punching was set to a mold for insert molding and the melted polycarbonate was loaded into the mold. The mold was cooled until polycarbonate was solidified. Then, the molds were separated to obtain an 8 curve lens where a concave surface of the lens was an anti-fogging and anti-fouling layer. The 8 curve lens obtained was directly applied to hard coat layer-forming steps (step of washing lens, step of immersing the lens in a hard coat solution, drying step and curing step). As a result, a hard coat layer was not formed on the surface of the anti-fogging and anti-fouling layer, but could be formed on a convex side. When a side of the anti-fogging and anti-fouling layer was evaluated for the anti-fogging property to exhalation, the test of anti-fouling property and the test of wiping property, all of the evaluation results were A.

Example 11

The anti-fogging and anti-fouling laminate prepared in Example 9 was exposed to the atmosphere of 500° C. for 7 seconds and was molded into an 8 curve lens (diameter: 80 mm) so that a concave surface was the anti-fogging and anti-fouling layer through vacuum molding. The anti-fogging and anti-fouling layer did not have any poor appearance such as scratch, crack and exfoliation. Then, the anti-fogging and anti-fouling laminate of the 8 curve lens (diameter: 80 mm) was subjected to punching with a Tomson blade.

Next, another anti-fogging and anti-fouling laminate having an 8 curve lens (diameter: 80 mm) was prepared in the same manner as described above.

These two anti-fogging and anti-fouling laminates each having an 8 curve lens (diameter: 80 mm) were set to molds for double insert molding and the melted polycarbonate was loaded into the molds. The molds were cooled until polycarbonate was solidified. Then, the molds were separated to obtain an 8 curve lens where both sides thereof (i.e., the concave and the convex) were the anti-fogging and anti-fouling layer. When the both sides were evaluated for the anti-fogging property to exhalation, the test of anti-fouling property and the test of wiping property, all of the evaluation results were A.

TABLE 3

|  | Example 10 | Example 11 |
| --- | --- | --- |
| Anti-fogging property to exhalation | A | A |
| Test of anti-fouling property | A | A |
| Test of wiping property | A | A |

Example 12

<Preparation of Anti-Fogging and Anti-Fouling Laminate>

As an inorganic substrate, S9213 (glass substrate, thickness: 1.2 mm to 1.5 mm) manufactured by Matsunami Glass Ind., Ltd. was used.

A solution having the following formulation was coated on the inorganic substrate so as to have a thickness of the coating of 100 nm. Then, it was subjected to a heating treatment at 110° C. for 30 minutes to obtain an anchor layer.

| -Solution (total: 100% by mass)- | |
| --- | --- |
| KBM-503 (manufactured by Shin-Etsu Chemical Co., Ltd.) | 1% by mass |
| i-Propanol | 49.5% by mass |
| Pure water | 49.5% by mass |

Next, the active energy ray curable resin composition used in Example 1 was coated on the anchor layer so as to have a thickness of the coating of 30 μm. A metal halide lamp was used to emit an ultraviolet ray at a radiation dose of 1,800 mJ/cm$^2$ under nitrogen atmosphere and cure the resultant anti-fogging and anti-fouling layer to obtain an anti-fogging and anti-fouling laminate.

The anti-fogging and anti-fouling laminate obtained was applied to the aforementioned evaluations. Results were presented in Table 4.

TABLE 4

| | Example 12 |
| --- | --- |
| Thickness of the coating (μm) | 30 |
| Contact Pure water | 113 |
| angle (°) Hexadecane | 67 |
| Anti-fogging property to exhalation | A |
| Test of anti-fouling property | A |
| Test of wiping property | A |

When the anti-fogging and anti-fouling layer was evaluated for close adhesiveness through the peering test of the cross-cut (1 mm intervals×100 squares) method with pieces of cellophane tape (manufactured by Nichiban Co., Ltd., CT24) according to JIS K 5400, the anti-fogging and anti-fouling layer had a favorable close adhesiveness of 100/100 (i.e., no peering was observed).

Note that, disposition of the anchor layer considerably improved the anti-fogging and anti-fouling layer in close adhesiveness.

INDUSTRIAL APPLICABILITY

The anti-fogging and anti-fouling laminate of the present invention can be used by attaching to glass windows, refrigerating/freezing show case, window materials for automobile windows, bath mirrors, mirrors such as side automobile mirrors, floors and walls of bath rooms, solar battery panels and security/surveillance cameras. Since one aspect of the anti-fogging and anti-fouling laminate of the present invention is easily molded and processed, the laminate can be used in a pair of glasses, goggles, head-gears, lenses, microlens arrays, and headlight covers, front panels, side panels and rear panels of automobiles by means of in-mold forming or insert molding.

REFERENCE SIGNS LIST 211 substrate made of a resin
212 anti-fogging and anti-fouling layer

The invention claimed is:

1. An anti-fogging and anti-fouling laminate, comprising:
a substrate; and
an anti-fogging and anti-fouling layer on the substrate where a surface of the anti-fogging and anti-fouling layer is flat,
wherein the anti-fogging and anti-fouling layer is a cured product obtained by curing an active energy ray curable resin composition through an active energy ray,
wherein the active energy ray curable resin composition includes a hydrophilic monomer having a radically polymerizable unsaturated group and a photopolymerization initiator,
wherein the hydrophilic monomer having a radically polymerized unsaturated group is a (meth)acrylate including a polyoxyalkylene chain,
wherein a content of the hydrophilic monomer having a radically polymerizable unsaturated group in the active energy ray curable resin composition is 60% by mass or more, and
wherein a surface of the anti-fogging and anti-fouling layer has a pure water contact angle of 90° or more.

2. The anti-fogging and anti-fouling laminate according to claim 1, wherein the active energy ray curable resin composition further includes a hydrophobic monomer having a radically polymerizable unsaturated group.

3. The anti-fogging and anti-fouling laminate according to claim 2, wherein a content of the hydrophobic monomer having a radically polymerizable unsaturated group in the active energy ray curable resin composition is more than 0.018% by mass.

4. The anti-fogging and anti-fouling laminate according to claim 1, wherein the substrate is a substrate made of a resin or an inorganic substrate.

5. A product, comprising:
the anti-fogging and anti-fouling laminate according to claim 1 on a surface thereof.

6. A method for manufacturing the product according to claim 5, the method comprising:
heating the anti-fogging and anti-fouling laminate; and
molding the anti-fogging and anti-fouling laminate heated into a desired shape.

7. The method for manufacturing the product according to claim 6,
wherein the heating is performed by infrared heating.

8. An anti-fouling method for protecting a product from getting dirty, the method comprising:
laminating an anti-fogging and anti-fouling laminate on a surface of the product, the anti-fogging and anti-fouling laminate being the anti-fogging and anti-fouling laminate according to claim 1.

9. An active energy ray curable resin composition, comprising:
a hydrophilic monomer having a radically polymerizable unsaturated group;
a hydrophobic monomer having a radically polymerizable unsaturated group; and
a photopolymerization initiator,
wherein the hydrophilic monomer having a radically polymerizable unsaturated group is a (meth)acrylate including a polyoxyalkylene chain,
wherein a content of the hydrophilic monomer having a radically polymerizable unsaturated group in the active energy ray curable resin composition is 60% by mass or more, and
wherein when the active energy ray curable resin composition is cured through an active energy ray to form an anti-fogging and anti-fouling layer, a surface of the anti-fogging and anti-fouling layer has a pure water contact angle of 90° or more.

10. The active energy ray curable resin composition according to claim 9, wherein the hydrophobic monomer having a radically polymerizable unsaturated group is a (meth)acrylate including at least one of fluorine and silicon.

* * * * *